Oct. 5, 1937.　　　　　M. STÖHR　　　　　2,095,106
ELECTRIC CONTROL SYSTEM
Filed Feb. 24, 1937
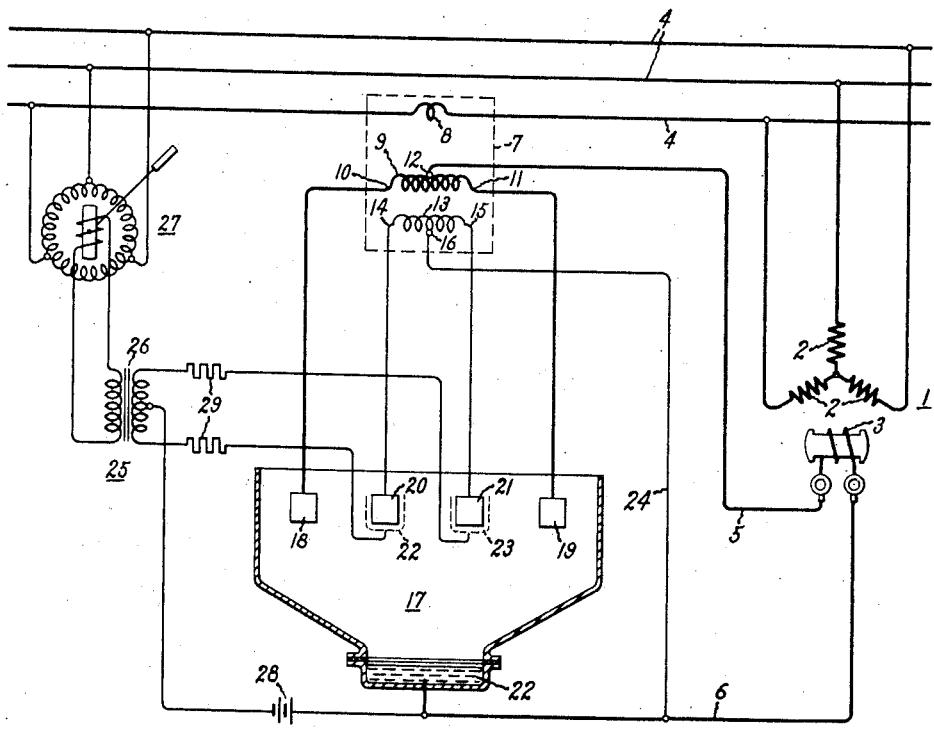
Inventor:
Max Stöhr,
by Harry E. Dunham
His Attorney.

Patented Oct. 5, 1937

2,095,106

UNITED STATES PATENT OFFICE 2,095,106

ELECTRIC CONTROL SYSTEM

Max Stöhr, Berlin-Hermsdorf, Germany, assignor to General Electric Company, a corporation of New York Application February 24, 1937, Serial No. 127,483
In Germany March 3, 1936

8 Claims. (Cl. 171—119)

My invention relates to electric control systems and more particularly to electric valve systems for controlling an associated circuit or apparatus.

In electric control systems, more particularly in control systems which are energized from alternating current circuits, it is frequently desirable to provide arrangements whereby the energization of the circuit or associated apparatus is controlled in accordance with the current of the alternating current circuit. For example, in excitation systems for alternating current dynamo-electric machines, it is frequently expedient and desirable to control the energization of the field circuit in accordance with the current of the alternating current circuit in order to maintain a predetermined electrical condition of the circuit, or to maintain a predetermined operating condition of the dynamo-electric machine. Because of the wide field of application and because of the flexibility of control, electric valve means are readily adaptable to control circuits of this nature. Heretofore where arrangements of this nature have been employed, it has been necessary to use controlled electric valve apparatus of inordinate proportions relative to the electric valve apparatus employed for supplying the load current. It has become increasingly apparent that there is a decided need for electric valve translating apparatus for supplying a direct current circuit from an alternating current circuit through control electric valve apparatus in which the control equipment effects a greater range of control and a more precise control than that available by employing the arrangements provided heretofore.

It is an object of my invention to provide a new and improved control system.

It is another object of my invention to provide a new and improved electric valve translating system for transmitting energy from an alternating current circuit to a direct current circuit.

It is a further object of my invention to provide a new and improved electric valve excitation system for dynamo-electric machines in which the excitation current is controlled in accordance with a condition of an associated circuit and in which the associated control apparatus effects a more precise control than heretofore available.

In accordance with the illustrated embodiment of my invention, I provide an improved electric valve translating system for supplying a direct current load circuit from an alternating current supply circuit. More specifically, the energization of the direct current circuit is controlled in accordance with the current of the alternating current circuit through an inductive device and interposed electric valve apparatus. The inductive device comprises a primary winding, which is energized in accordance with the current of the alternating current circuit, and a secondary winding and a tertiary winding, all of which are inductively associated with each other. A main or principal electric valve means is interposed between the secondary winding and the direct current circuit to energize the direct current circuit in accordance with the current of the alternating current circuit. A second electric valve means having control members is connected to control the impedance of the tertiary winding circuit to effect control of the energy interchange between the primary winding and the secondary winding. The control members of the control electric valve means are energized to render the control electric valve means conductive during predetermined portions of each half cycle of alternating voltage of the tertiary winding to control the periods of conduction of the main electric valve means and hence to control the voltage which is impressed on the direct current circuit.

For a better understanding of my invention, reference may be had to the following description taken in connection with the accompanying drawing, and its scope will be pointed out in the appended claims. The single figure of the accompanying drawing diagrammatically represents an embodiment of my invention as applied to an excitation circuit for a dynamo-electric machine of the synchronous type.

Referring now to the single figure of the accompanying drawing, I have diagrammatically shown my invention as applied to a control or regulating system for a dynamo-electric machine 1 of the synchronous type having armature windings 2 and a relatively movable field winding 3. The armature windings 2 are connected to an alternating current circuit 4 which may serve as a source of energy for the dynamo-electric machine 1 when the machine 1 is operating as a motor, or which may serve as a load circuit when the dynamo-electric machine 1 is operating as a generator.

In order to control the energization of the field winding 3 of dynamo-electric machine 1 through a direct current circuit including conductors 5 and 6, in accordance with an electrical condition such as the current of the alternating current circuit 4, I employ an inductive device 7. The inductive device 7 comprises a primary winding 8 which is energized in accordance with the current of the alternating current circuit 4, a secondary winding 9 having terminal connections 10 and 11 and an electrically intermediate connection 12, and a tertiary winding 13 having terminal connections 14 and 15 and an electrically intermediate connection 16. The primary winding 8, secondary winding 9 and the tertiary winding 13 are inductively associated with each other and where desirable a suitable magnetic core structure may be employed to effect this inductive interlinkage. To effect the energy transfer between the inductive device 7 and the direct current load circuit including conductors 5 and 6 and to effect rectification of the alternating current provided by the secondary winding 9, I employ electric valve means 17 which may be of the type employing a plurality of anodes 18, 19, 20, and 21, and a single associated cathode 22. The electric valve means 17, as shown, may be of the vapor electric discharge type. Although I have chosen to illustate my invention as employing electric valve means of the type having a plurality of anodes and a single cathode enclosed within one receptacle, it will be well understood by those skilled in the art that I may employ a plurality of electric valve means each having a single anode and a single cathode enclosed within a receptacle. Considering more particularly the electric valve means 17 diagrammatically shown in the drawing, it will be noted that there are four arc discharge paths provided therein, and that the arc discharge paths associated with anodes 20 and 21 are provided with control members 22 and 23 which serve to control the conductivities of the associated arc discharge paths and also serve to control the amount of energy interchange between primary winding 8 and secondary winding 9 of inductive device 7. This control of the flux linkage between primary winding 8 and secondary winding 9 of the inductive device 7 may be accomplished through the tertiary winding 13, the arc discharge paths associated with anodes 20 and 21, and a connection or conductor 24 connected between the electrically intermediate connection 16 of tertiary winding 13 and conductor 6 of the direct current circuit.

I provide any conventional control circuit 25 for energizing control members 22 and 23 to control the conductivities of the associated arc discharge paths. The excitation circuit 25 may comprise a transformer 26 which is energized from the alternating current circuit 4 through any suitable phase shifting device such as the rotary phase shifter 27, a source of negative biasing potential such as a battery 28, and current limiting resistances 29. If desired, the transformer 26 may be of the type designed to supply a voltage of peaked wave form to effect a precise regulation of the time during each half cycle of voltage at which the arc discharge paths associated with anodes 20 and 21 are rendered conductive.

Although, for the purposes of explaining my invention, I have shown my invention as applied to an excitation system for a dynamo-electric machine, it is to be understood that my invention in its broader aspects may be applied to electric control systems generally wherein it is desired to effect energization of a load circuit in accordance with the current of an alternating current supply circuit.

The general principles of operation of the embodiment of my invention diagrammatically shown in the single figure will be explained by considering the arrangement when the dynamo-electric machine 1 is operating as a synchronous alternating current generator to supply alternating current to the circuit 4. The field winding 3 of the machine 1 will be energized from the circuit 4 through the inductive device 7, the arc discharge paths associated with anodes 18 and 19 of electric valve means 17, and the direct current circuit including conductors 5 and 6. As will be well understood by those skilled in the art, the arc discharge paths associated with anodes 18 and 19 will be rendered conductive alternately to supply unidirectional current to the field winding 3. By the proper proportionment of the inductive device 7, the voltage induced in the secondary winding 9 may be made to vary in accordance with the current of the alternating current circuit 4. For example, the device 7 may be arranged to increase the current supplied to the field winding 3 upon increase of the current in the alternating current circuit 4 and to effect a decrease in the current supplied to the field winding upon a decrease of current in the circuit 4.

By the proper adjustment of the phase of the alternating potentials impressed on control members 22 and 23, the time at which the associated arc discharge paths are rendered conductive may be controlled, thereby effecting a control of the interval of conduction of the arc discharge paths associated with anodes 18 and 19. It is to be understood that when there is substantial phase coincidence between the voltages impressed on control members 22 and 23 relative to the voltages impressed on anodes 20 and 21, the associated arc discharge paths will conduct current for substantially the entire respective half cycles, and that when there is substantial phase opposition between these voltages the associated arc discharge paths will be maintained nonconductive. Furthermore, since the tertiary winding 13 and the associated arc discharge paths including anodes 20 and 21 act as a virtual short circuit through the conductor 24 when these arc discharge paths are rendered conductive, the current will be transferred from the anodes 18 and 19 to the anodes 20 and 21 rendering the associated arc paths nonconductive. This transfer is occasioned by the change in the flux interlinkages of the inductive device 7 and due to the fact that the impedance of the output circuit associated with the tertiary winding 13 is substantially less than the impedance of the output circuit associated with the secondary winding 19. In this manner, by controlling the time during each half cycle at which the arc discharge paths associated with anodes 20 and 21 are rendered conductive, the periods of conductivity of the arc discharge paths associated with anodes 18 and 19 may be controlled to effect control of the average value of direct current supplied to the field winding 3.

Although in the particular embodiment of my invention described the control circuit 25 is the manually operated type, it is to be understood that I may employ automatic means responsive to a predetermined electrical condition of the circuit 4, or responsive to an operating condition of machine 1 to control the voltages impressed on control members 22 and 23 and thereby effect automatic control or regulation of the energization of the field winding 3.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, means for energizing said direct current circuit in accordance with the current of said alternating current circuit including an inductive device having a primary winding energized in accordance with the current of said alternating current circuit and having a secondary winding inductively associated with said primary winding and an electric valve means interposed between said secondary winding and said direct current circuit for supplying direct current thereto, and means for controlling the flux linkages between said primary winding and said secondary winding to control the average current supplied to said direct current circuit.

2. In combination, an alternating current circuit, a direct current circuit, means for energizing said direct current circuit in accordance with the current of said alternating current circuit including an inductive device having a primary winding energized in accordance with the current of said alternating current circuit and a secondary winding and a tertiary winding inductively associated with said primary winding and with each other, electric valve means interposed between said secondary winding and said load circuit for supplying direct current thereto, and means connected in circuit with said tertiary winding for controlling the impedance of the tertiary winding circuit to effect control of the energy transfer from said primary winding to said secondary winding to control the energization of said load circuit.

3. In combination, an alternating current circuit, a direct current circuit, means for energizing said direct current circuit in accordance with the current of said alternating current circuit including an inductive device having a primary winding energized in accordance with the current of said alternating current circuit, and a secondary winding and a tertiary winding inductively associated with said primary winding and with each other, an electric valve means interposed between said secondary winding and said load circuit for supplying direct current thereto, and a second electric valve means connected in circuit with said tertiary winding for controlling the transfer of energy from said primary winding to said secondary winding to control the energization of said load circuit.

4. In combination, an alternating current circuit, a direct current load circuit, a plurality of inductively associated windings, one of said windings being energized in accordance with the current of said alternating current circuit, an electric valve means interposed between said load circuit and another of said windings for energizing said load circuit from said alternating current circuit, and a second electric valve means interposed between a third winding and said load circuit for controlling the voltage impressed on said load circuit by said first mentioned electric valve means.

5. In combination, an alternating current circuit, a direct current circuit, an inductive device having a primary, a secondary and a tertiary winding inductively associated, said primary winding being energized in accordance with the current of said alternating current circuit, a pair of arc discharge paths for transmitting energy from said alternating current circuit to said direct current circuit, a second pair of arc discharge paths including control members for controlling the conductivity thereof, said second pair of arc discharge paths being connected to short circuit said tertiary winding when said second discharge paths are conductive, and means for energizing said control members to render the second arc paths conductive for predetermined intervals during each cycle of alternating voltage of said tertiary winding to control the energization of said direct current circuit.

6. In combination, an alternating current circuit, a direct current load circuit, an inductive device having a primary winding, a secondary winding and a tertiary winding inductively associated with each other, said primary winding being energized in accordance with the current of said alternating current circuit, said secondary and tertiary windings each having terminal connections and a connection electrically intermediate said terminal connections, an electric valve means connected between the terminal connections of said secondary winding and one terminal of said direct current circuit, the intermediate connection of said secondary winding being connected to the other terminal of said direct current circuit, a second electric valve means connected between the terminal connections of said tertiary winding and the first mentioned terminal of said direct current circuit, said intermediate connection of said tertiary winding being connected to the first mentioned terminal of said direct current circuit, and means for controlling the conductivity of said second electric valve means to control the periods of conduction of the first mentioned electric valve means to control the current supplied to said load circuit.

7. In combination, an alternating current circuit, a direct current circuit, an electric translating apparatus interposed between said circuits for transmitting energy from said alternating current circuit to said direct current circuit comprising an inductive device including a primary winding energized in accordance with the current of said alternating current circuit and secondary and tertiary windings inductively associated with each other and with said primary winding, electric valve means connected between said secondary winding and said direct current circuit for supplying to said circuit a direct current, the magnitude of which varies in accordance with the current of said alternating current circuit and control electric valve means connected to said tertiary winding and arranged to periodically short circuit said tertiary winding to control the periods of conduction of said first mentioned electric valve means to control the average value of the current supplied to said direct current circuit through said secondary winding.

8. In combination, an alternating current circuit, a dynamo-electric machine of the synchronous type having an armature winding connected to said alternating current circuit and having a field winding, and means for energizing said field winding in accordance with the current of said alternating current circuit comprising an inductive device having a primary winding energized in accordance with the current of said alternating current circuit and inductively associated secondary and tertiary windings, an electric valve means interposed between said secondary winding and said field winding for supplying direct current to said field winding, and a control electric valve means connected to said tertiary winding for periodically short circuiting said tertiary winding to control the average value of direct current supplied to said field winding through said secondary winding and said first mentioned electric valve means.

MAX STÖHR.